United States Patent
Lee et al.

(10) Patent No.: US 10,459,511 B2
(45) Date of Patent: Oct. 29, 2019

(54) DISPLAY DEVICE AND TERMINAL FOR CONTROLLING THE SAME

(71) Applicant: LG ELECTRONICS INC., Seoul (KR)

(72) Inventors: Sangrok Lee, Seoul (KR); Sunho Hwang, Seoul (KR); Kwangseob Jeong, Seoul (KR); Sijin Kim, Seoul (KR); Eunjung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/891,733

(22) Filed: Feb. 8, 2018

(65) Prior Publication Data
US 2019/0086991 A1    Mar. 21, 2019

Related U.S. Application Data

(63) Continuation of application No. PCT/KR2017/010265, filed on Sep. 19, 2017.

(51) Int. Cl.
*G06F 1/3234* (2019.01)
*H04N 21/443* (2011.01)

(52) U.S. Cl.
CPC ....... *G06F 1/3265* (2013.01); *H04N 21/4436* (2013.01); *G09G 2330/021* (2013.01)

(58) Field of Classification Search
CPC .............. G06F 1/3265; H04N 21/4436; G09G 2330/021
See application file for complete search history.

(56) References Cited

U.S. PATENT DOCUMENTS

| | | | |
|---|---|---|---|
| 8,578,429 B2 | 11/2013 | Lim et al. | |
| 8,881,206 B2 | 11/2014 | Lim et al. | |
| 8,881,207 B2 | 11/2014 | Lim et al. | |
| 8,908,105 B2 | 12/2014 | Chen | |
| 9,078,258 B2 | 7/2015 | Ukita et al. | |
| 9,282,582 B1* | 3/2016 | Dunsbergen | H04W 48/12 |

(Continued)

FOREIGN PATENT DOCUMENTS

WO    WO 2016/138551    9/2016

OTHER PUBLICATIONS

LG's signature All-Red TV W, which won the CES Grand Prix, was released. The price is 14 million Yuan. Huffpost Korea, Feb. 23, 2017 (Korea text and English translation).

(Continued)

*Primary Examiner* — Brian P Yenke
(74) *Attorney, Agent, or Firm* — KED & Associates LLP

(57) ABSTRACT

Provided is a display device. The display device includes a wireless communication unit configured to transmit/receive a packet according to a wireless communication manner, a storage unit configured to store information of at least one wake-up registration device, and a controller configured to allow the wireless communication unit to operate in a wake-up mode when power of the display device is turned off. The wireless communication unit outputs a first packet including information of the display device as operating in the wake-up mode, receives a second packet corresponding to a response of the outputted first packet, and turns on the power of the display device on the basis of the received second packet.

13 Claims, 16 Drawing Sheets

(56) References Cited

U.S. PATENT DOCUMENTS

| | | | |
|---|---|---|---|
| 9,503,841 B2* | 11/2016 | Knaappila | H04W 4/80 |
| 9,640,065 B2 | 5/2017 | Lee et al. | |
| 9,813,845 B2* | 11/2017 | Kim | H04W 76/14 |
| 9,961,484 B2* | 5/2018 | Choi | H04W 4/80 |
| 10,063,804 B2* | 8/2018 | Yang | H04N 5/63 |
| 10,306,397 B2* | 5/2019 | La | H04W 52/0235 |
| 2004/0132502 A1* | 7/2004 | Matsumura | G06F 1/3203 455/574 |
| 2011/0021142 A1* | 1/2011 | Desai | H04W 8/005 455/41.2 |
| 2011/0197085 A1* | 8/2011 | Wu | H04B 3/546 713/323 |
| 2013/0109323 A1* | 5/2013 | Ruutu | H04B 5/0031 455/68 |
| 2013/0170426 A1 | 7/2013 | Ukita et al. | |
| 2014/0094198 A1* | 4/2014 | Heo | H04W 52/0274 455/456.4 |
| 2014/0320750 A1 | 10/2014 | Chen | |
| 2015/0103708 A1* | 4/2015 | Kang | H04W 72/0433 370/311 |
| 2015/0271542 A1 | 9/2015 | Lim et al. | |
| 2015/0296073 A1* | 10/2015 | Lo | G08C 17/02 455/41.2 |
| 2016/0077573 A1* | 3/2016 | Lee | H04L 12/12 713/310 |
| 2016/0278016 A1* | 9/2016 | Wang | H04W 52/0229 |
| 2016/0371961 A1* | 12/2016 | Narang | H04W 8/005 |
| 2016/0381636 A1* | 12/2016 | Park | H04W 52/0229 370/311 |
| 2017/0013153 A1* | 1/2017 | Shin | H04W 76/10 |
| 2017/0078610 A1* | 3/2017 | Yang | H04N 5/63 |
| 2017/0110005 A1* | 4/2017 | Yang | H04N 21/42224 |
| 2017/0154326 A1* | 6/2017 | Jo | H04W 4/04 |
| 2017/0193815 A1 | 7/2017 | Lee et al. | |
| 2017/0215030 A1* | 7/2017 | Choi | H04W 4/008 |
| 2017/0215113 A1* | 7/2017 | Lee | H04W 36/00 |
| 2017/0223579 A1* | 8/2017 | Lee | H04W 48/14 |
| 2017/0223615 A1* | 8/2017 | Lee | H04W 48/14 |
| 2017/0367126 A1* | 12/2017 | Ikeda | H04L 12/12 |
| 2017/0372600 A1* | 12/2017 | Palin | G06F 3/0484 |
| 2018/0103229 A1* | 4/2018 | Yang | H04W 76/10 |
| 2018/0183919 A1* | 6/2018 | Kyou | H04W 4/80 |
| 2018/0310247 A1* | 10/2018 | Chu | H04W 52/0235 |

OTHER PUBLICATIONS

International Search Report dated Jun. 14, 2018 issued in Application No. PCT/KR2017/010265.

* cited by examiner

PRIOR ART

Wake-up (Power On)

Power Off

DISPLAY DEVICE AND TERMINAL FOR CONTROLLING THE SAME

CROSS-REFERENCE TO RELATED APPLICATIONS

This application is a Continuation Application of PCT Application No. PCT/KR2017/010265, filed on Sep. 19, 2017, whose entire disclosure is hereby incorporated by reference.

BACKGROUND

1. Field

The present disclosure relates to a display device and a terminal for controlling the same, and more particularly, to a display device of which power is turned on by a packet outputted from a terminal in a state in which the power is turned off or which is capable of performing a specific operation while turning on the power, and a terminal that is capable of controlling the display device so that the power of the display device is turned on, or the display device performs a specific operation while turning on the power.

2. Background

Display devices are devices having functions of receiving, processing, and displaying an image to be viewed to a user. For example, such a display device receives a broadcast signal selected by a user from broadcast signals transmitted from the broadcasting station, separates an image signal from the received signal, and displays the separated image signal on a display.

In recent years, due to development of broadcasting technologies and network technologies, display devices have been considerably diversified in function and thus improved in performance. That is, display devices have been developed to provide various other contents as well as just broadcasted contents to a user. For example, display devices may provide game play, music appreciation, internet shopping, and user-customized information by various applications as well as programs received from the broadcasting stations. To perform such an extended function, display devices may be basically connected to other devices or networks by using various communication protocols and provide ubiquitous computing to the user. That is, display devices have evolved into smart devices that enable connectivity to networks and ubiquitous computing.

In a state in which power of such a display device is turned off, there is a method of turning on the power of the display device through a terminal (for example, a smart phone). For example, when the terminal includes an infrared transceiver, the terminal may transmits an infrared signal to the display device to turn on the power of the display device. Alternatively, when the terminal and the display device are connected to each other through the network, a signal for turning on the power of the display device may be transmitted through the network.

However, in the methods according to the related art, there is an inefficient aspect that the terminal has to include the infrared transceiver or to be previously connected to the display device through the network. A vehicle typically includes a power source, such as an internal combustion engine vehicle, an external combustion engine vehicle, a gas turbine vehicle, an electric vehicle, etc. according to a type of motor used.

An electric vehicle typically utilizes an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian.

An intelligent vehicle is an advanced vehicle implementing information technology (IT) and is sometimes referred to as a "smart vehicle." Some intelligent vehicles provide improved traffic efficiency by implementing an advanced vehicle system and via association with an intelligent traffic system (ITS).

In addition, research into sensors mounted in such an intelligent vehicle has been actively conducted. Such sensors typically include, for example, a camera, an infrared sensor, a radar, a global positioning system (GPS), a Lidar, or a gyroscope. In particular, a camera is often an important sensor playing the role of human eyes.

SUMMARY

Embodiments provide a display device that is capable of receiving a packet outputted from a terminal when power is turned off to turn on the power or perform a specific operation even though the display device is not connected to the terminal through a network, and the terminal.

In one embodiment, a display device includes: a wireless communication unit configured to transmit/receive a packet according to a wireless communication scheme; a storage unit configured to store information of at least one wake-up registration device; and a controller configured to allow the wireless communication unit to operate in a wake-up mode when power of the display device is turned off, wherein the wireless communication unit outputs a first packet including information of the display device as operating in the wake-up mode, receives a second packet corresponding to a response of the outputted first packet, and turns on the power of the display device on the basis of the received second packet.

The wireless communication unit may identify a terminal that outputs the second packet on the basis of the received second packet, and when the identified terminal corresponds to the at least one wake-up registration device, the power of the display device may be turned on.

The information of the at least one wake-up registration device may include a MAC address or a Bluetooth device address of the at least one wake-up registration device, and the wireless communication unit may identify the terminal on the basis of the MAC address of the terminal or the Bluetooth device address of the terminal, which is contained in the second packet.

The wireless communication unit may identify the terminal when the information of the display device is contained in the second packet.

If the information of the at least one wake-up registration device exists in the storage unit, the controller may control the wireless communication unit to operate in the wake-up mode when the power of the display device is turned off.

The wireless communication unit may transmit a trigger signal for turning on the power of the display device to the controller on the basis of the received second packet.

The display device may further include a power supply unit configured to supply power to the display device, wherein the wireless communication unit may control the power supply unit to turn on the power of the display device on the basis of the received second packet.

The second packet may further include a specific function or application execution request of the display device, and the controller may execute the specific function or the application when the power of the display device is turned on.

The display device may further include a display unit, wherein the second packet may further include a screen mirroring execution request, and the controller may receive image data corresponding to a screen displayed on the terminal from the terminal transmitting the second packet when the power of the display device is turned on and control the display unit to display a mirroring screen through the display unit on the basis of the received image data.

The first packet may further include encoding information, and the wireless communication unit may decode the received second packet on the basis of the encoding information and turn on the power of the display device on the basis of the decoded second packet.

The wireless communication unit may periodically output the first packet including the encoding information as operating in the wake-up mode, and the encoding information may be changed every time the first packet is outputted.

The wireless communication unit may decode the received second packet on basis of a plurality of pieces of encoding information contained in a plurality of first packets that are outputted between a time point before a reference time from the current time point and the current time point.

The wireless communication unit may include a Bluetooth module configured to support Bluetooth low energy (BLE), and each of the first packet and the second packet may correspond to an advertising packet of the BLE.

In another embodiment, a terminal includes: a wireless communication unit configured to receive a first packet outputted from a display device of which power is turned off; a storage unit configured to store information of at least one wake-up enabled device; and a controller configured to identify the display device on the basis of the received first packet, generate a second packet including information of the terminal when the information of the at least one wake-up enabled device includes the information of the identified display device, and control the wireless communication unit to output the generated second packet.

The details of one or more implementations are set forth in the accompanying drawings and the description below. Other features will be apparent from the description and drawings, and from the claims.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment, for example, as an artificial display device that adds a computer supporting function to a broadcast receiving function, may have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS may be used.

Accordingly, since various applications are freely added or deleted on a general purpose OS kernel, a display device described in this embodiment, for example, may perform various user-friendly functions. The display device, in more detail, may be network TV, HBBTV, smart TV, LED TV, OLED TV, and so on and in some cases, may be applied to a smartphone.

Figure 1:
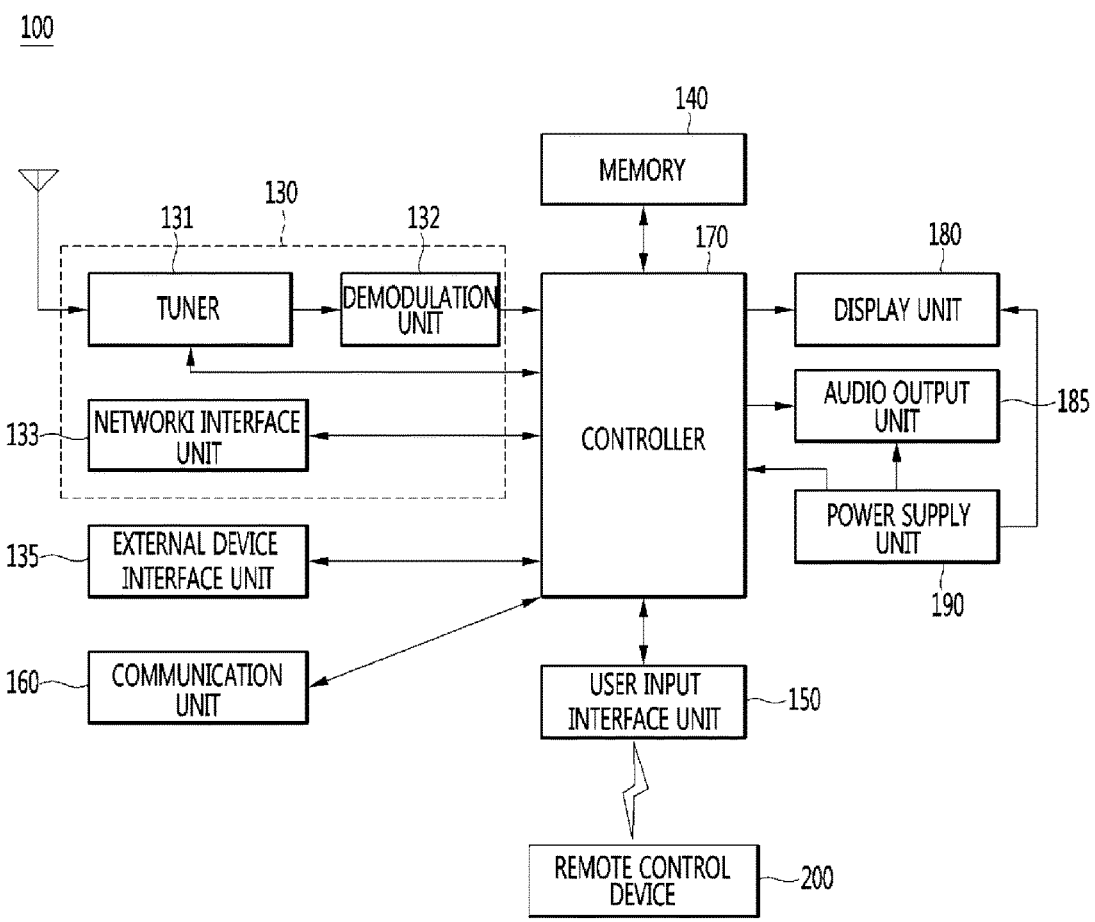
FIG. 1 is a block diagram illustrating a configuration of a display device according to an embodiment.

FIG. 1 is a block diagram illustrating a configuration of a display device according to an embodiment.

Referring to FIG. 1, a display device 100 may include a broadcast reception unit 130, an external device interface unit 135, a storage unit 140, a user input interface unit 150, a controller 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list in an adjacent external device and deliver it to the controller 170 or the storage unit 140.

The external device interface unit 135 may provide a connection path between the display device 100 and an external device. The external device interface unit 135 may receive at least one of image and audio output from an external device that is wirelessly or wiredly connected to the display device 100 and deliver it to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be output through the display unit 180. A sound signal of an external device inputted through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

The network interface unit 133 may provide an interface for connecting the display device 100 to a wired/wireless network including internet network. The network interface unit 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface unit 133 may access a predetermined webpage through an accessed network or another network linked to the accessed network. That is, it may transmit or receive data to or from a corresponding server by accessing a predetermined webpage through network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an internet or content provider or a network operator.

The network interface unit 133 may select and receive a desired application among applications open to the air, through network.

The storage unit 140 may store signal-processed image, voice, or data signals stored by a program in order for each signal processing and control in the controller 170.

Additionally, the storage unit 140 may perform a function for temporarily store image, voice, or data signals output from the external device interface unit 135 or the network interface unit 133 and may store information on a predetermined image through a channel memory function.

The storage unit 140 may store an application or an application list inputted from the external device interface unit 135 or the network interface unit 133.

The display device 100 may play content files (for example, video files, still image files, music files, document files, application files, and so on) stored in the storage unit 140 and provide them to a user.

The user input interface unit 150 may deliver signals inputted from a user to the controller 170 or deliver signals from the controller 170 to a user. For example, the user input interface unit 150 may receive or process control signals such as power on/off, channel selection, and screen setting from the remote control device 200 or transmit control signals from the controller 170 to the remote control device 200 according to various communication methods such as Bluetooth, Ultra Wideband (UWB), ZigBee, Radio Frequency (RF), and IR.

Additionally, the user input interface unit 150 may deliver, to the controller 170, control signals inputted from local keys (not shown) such as a power key, a channel key, a volume key, and a setting key.

Image signals that are image-processed in the controller 170 may be inputted to the display unit 180 and displayed as an image corresponding to corresponding image signals. Additionally, image signals that are image-processed in the controller 170 may be inputted to an external output device through the external device interface unit 135.

Voice signals processed in the controller 170 may be output to the audio output unit 185. Additionally, voice signals processed in the controller 170 may be inputted to an external output device through the external device interface unit 135.

Besides that, the controller 170 may control overall operations in the display device 100.

Additionally, the controller 170 may control the display device 100 by a user command or internal program inputted through the user input interface unit 150 and download a desired application or application list into the display device 100 in access to network.

The controller 170 may output channel information selected by a user together with processed image or voice signals through the display unit 180 or the audio output unit 185.

Additionally, according to an external device image playback command received through the user input interface unit 150, the controller 170 may output image signals or voice signals of an external device such as a camera or a camcorder, which are inputted through the external device interface unit 135, through the display unit 180 or the audio output unit 185.

Moreover, the controller 170 may control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 may be a still image or video and also may be a 2D image or a 3D image.

Additionally, the controller 170 may play content stored in the display device 100, received broadcast content, and external input content inputted from the outside, and the content may be in various formats such as broadcast images, external input images, audio files, still images, accessed web screens, and document files.

The display unit 180 may convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment and its specific operation or device does not limit the scope of the present disclosure.

According to another embodiment, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents inputted from the image processing device.

In this case, an operating method of a display device according to an embodiment described below may be performed by one of the display device described with reference to FIG. 1, an image processing device such as the separated set-top box, and a content playback device including the display unit 180 and the audio output unit 185.

Figure 2:
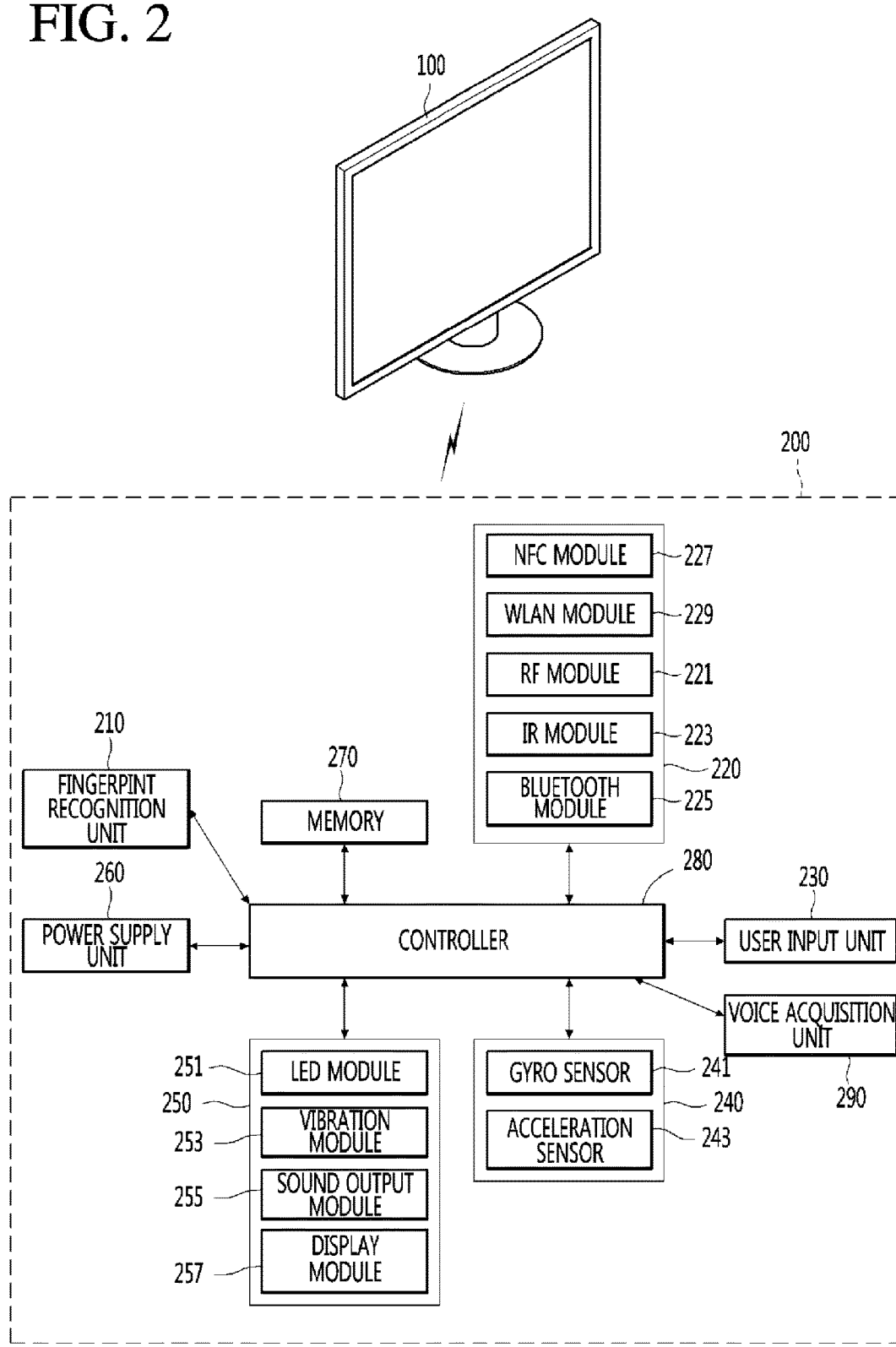
FIG. 2 is a block diagram illustrating a remote control device according to an embodiment.
Figure 3:
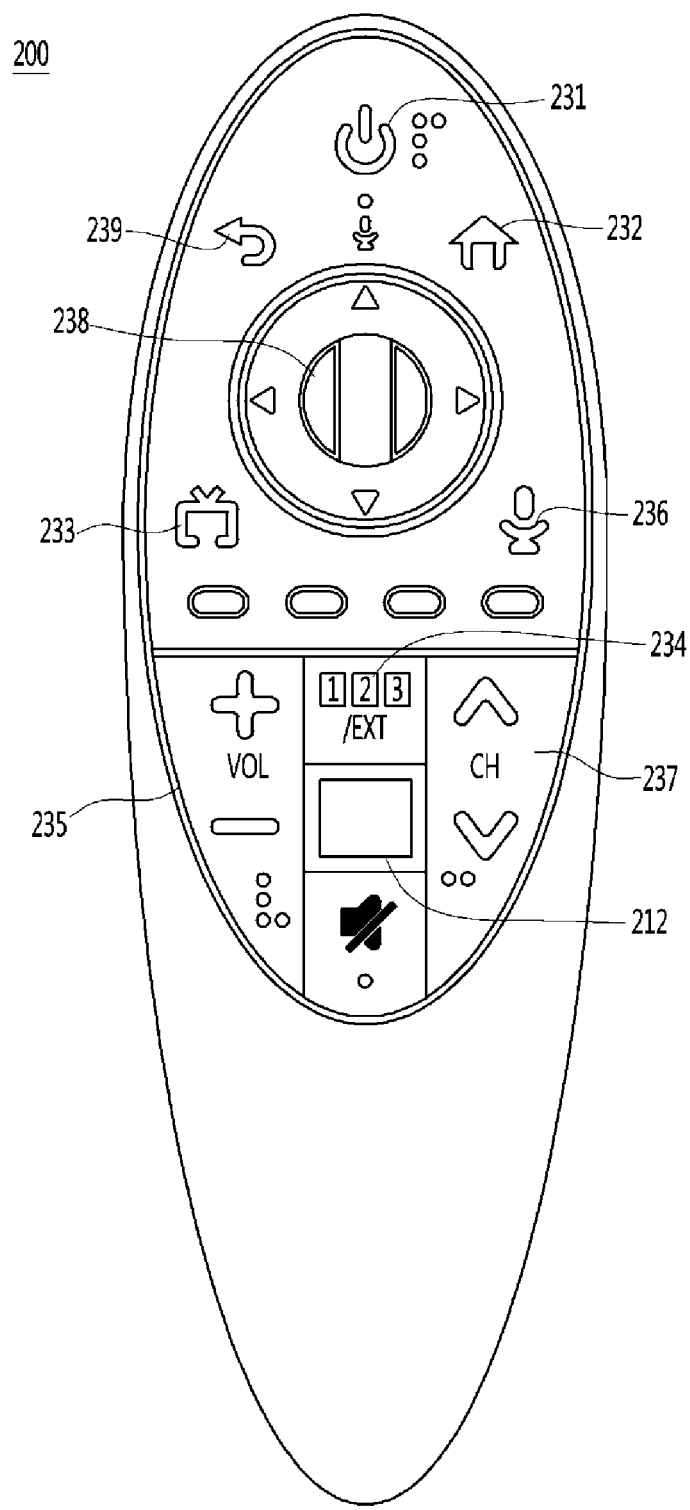
FIG. 3 is a view illustrating an actual configuration of the remote control device according to an embodiment.

Then, referring to FIGS. 2 and 3, a remote control device is described according to an embodiment.

FIG. 2 is a block diagram illustrating a remote control device according to an embodiment and FIG. 3 is a view illustrating an actual configuration of a remote control device according to an embodiment.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 225 transmits/receives signals to/from an arbitrary any one of display devices according to the above-mentioned embodiments.

The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be button for turning on/off the power of the display device 100. The power button 232 may be button for moving to the home screen of the display device 100. The live button 233 may be a button for displaying live broadcast programs. The external input button 234 may be button for receiving an external input connected to the display device 100. The voice adjustment button 235 may be button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 is described.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present disclosure.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals corresponding to a manipulation of the user input unit 230 or corresponding to signals transmitted from the display device 100. A user may recognize whether the user input unit 230 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage unit 270, information on a frequency band for transmitting/receiving signals to/from the display device 100 paired with the remote control device 200 and refer to it.

The controller 280 controls general matters relating to a control of the remote control device 200. The controller 280 may transmit a signal corresponding to a predetermined key manipulation of the user input unit 230 or a signal corresponding to a movement of the remote control device 200 sensed by the sensor unit 240 to the display device 100 through the wireless communication unit 225.

Additionally, the voice acquisition unit 290 of the remote control device 200 may obtain voice.

The voice acquisition unit 290 may include at least one microphone 291 and obtain voice through the microphone 291.

Figure 4:
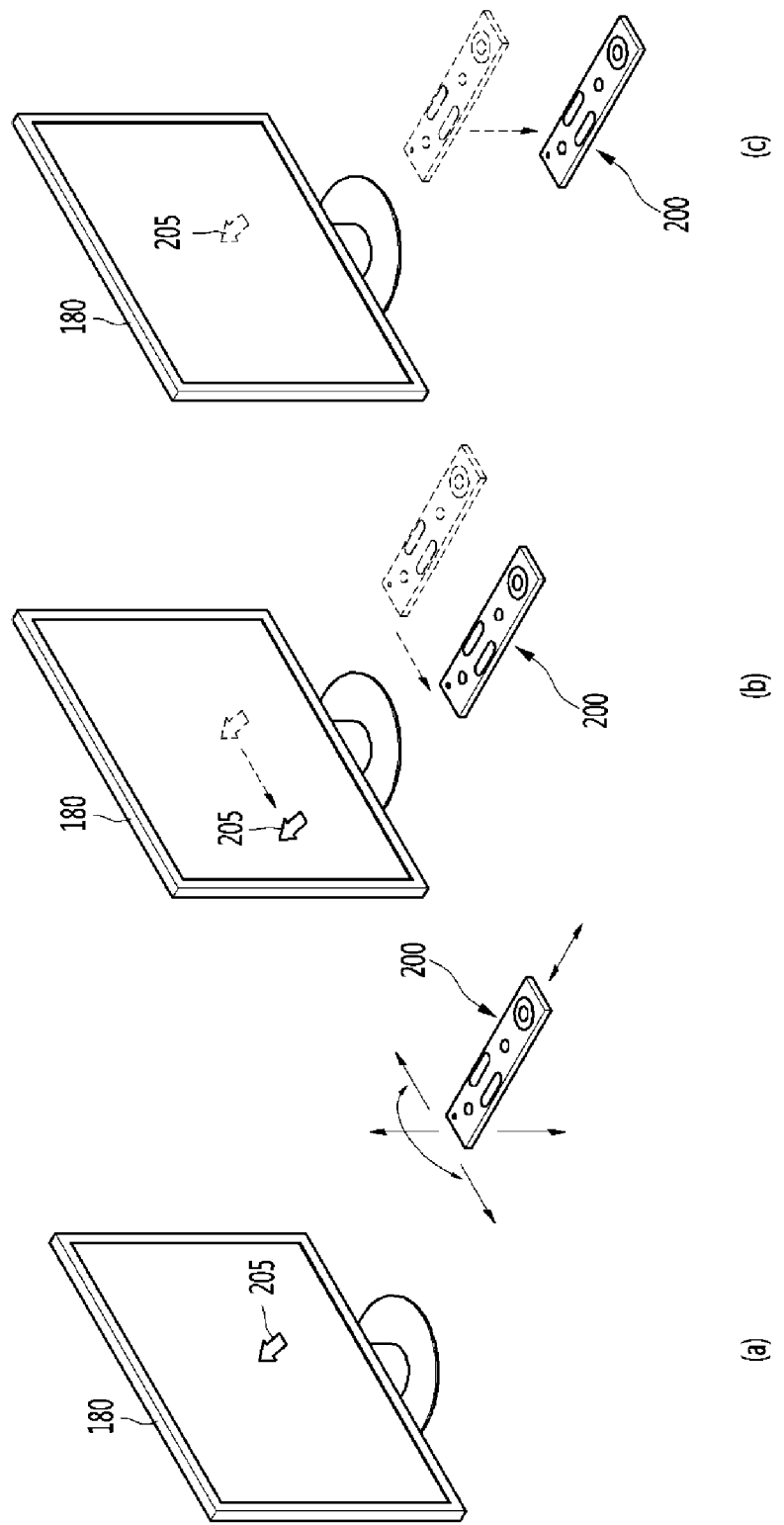
FIG. 4 is a view of utilizing the remote control device according to an embodiment.

Then, FIG. 4 is described.

FIG. 4 is a view of utilizing a remote control device according to an embodiment.

FIG. 4A illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 may be zoomed in and displayed largely.

On the other hand, if a user moves the remote control device 200 close to the display unit 180, a selection area in the display unit 180 corresponding to the pointer 205 may be zoomed out and displayed reduced.

On the other hand, if the remote control device 200 is away from the display unit 180, a selection area may be zoomed out and if the remote control device 200 is close to the display unit 180, a selection area may be zoomed in.

Additionally, if a specific button in the remote control device 200 is pressed, the recognition of a vertical or horizontal movement may be excluded. That is, if the remote control device 200 is moved away from or close to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
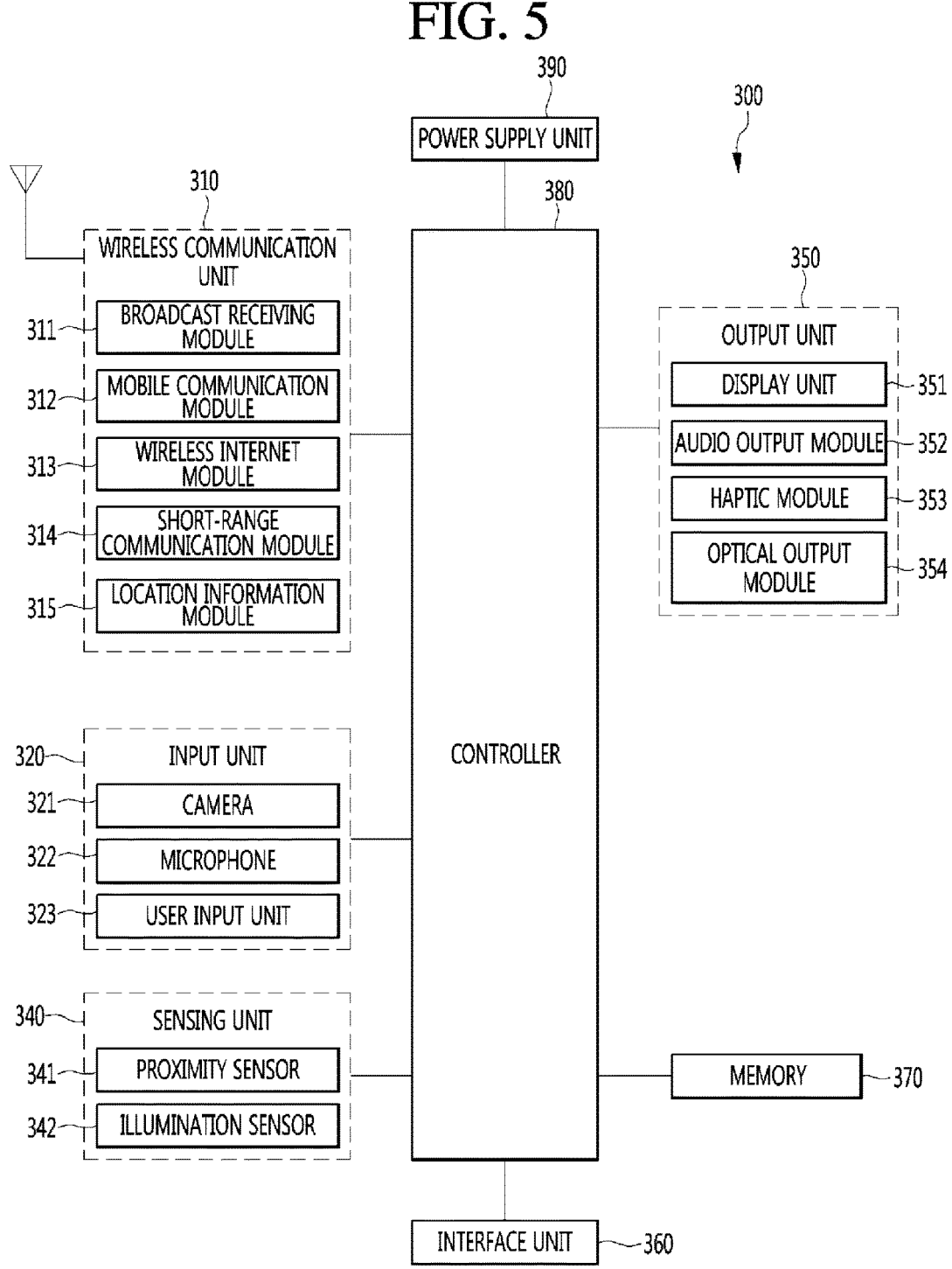
FIG. 5 is a block diagram illustrating a configuration of a terminal that is capable of being connected to the display device of FIG. 1.

FIG. 5 is a block diagram illustrating a configuration of a terminal that is capable of being connected to the display device of FIG. 1.

Terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), internet of things (IoT) terminal, and the like.

By way of non-limiting example only, further description will be made with reference to particular types of mobile terminals. However, such teachings apply equally to other types of terminals, such as those types noted above. In addition, these teachings may also be applied to stationary terminals such as desktop computers, and the like.

Referring to FIG. 5, the terminal 300 is shown having components such as a communication unit 310, an input unit 320, a sensing unit 340, an output unit 350, an interface unit 360, a memory 370, a controller 380, and a power supply unit 390. It is understood that implementing all of the illustrated components is not a requirement, and that greater or fewer components may alternatively be implemented.

The communication unit 310 typically includes one or more modules which permit communications such as wireless communications between the terminal 300 and a wireless communication system, communications between the terminal 300 and another terminal, communications between the terminal 300 and an external server. Further, the communication unit 310 typically includes one or more modules which connect the terminal 300 to one or more networks. To facilitate such communications, the communication unit 310 includes one or more of a broadcast receiving module 311, a mobile communication module 312, a wireless Internet module 313, a short-range communication module 314, and a location information module 315.

Among these, the short-range communication module 314 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 314 in general supports wireless communications between the terminal 300 and a wireless communication system, communications between the terminal 300 and another terminal 300, or communications between the terminal and a network where another terminal 300 (or an external server) is located, via wireless area networks. One example of the wireless area networks is a wireless personal area networks.

Particularly, the short-range communication module 314 provided in the terminal 300 according to an embodiment may support a Bluetooth low energy (BLE) scheme. Since the basic contents of the BLE scheme are well known, detailed descriptions thereof will be omitted.

The input unit 320 includes a camera 321 for obtaining images or video, a microphone 322, which is one type of audio input device for inputting an audio signal, and a user input unit 323 (for example, a touch key, a push key, a mechanical key, a soft key, and the like) for allowing a user to input information. Data (for example, audio, video, image, and the like) is obtained by the input unit 320 and may be analyzed and processed by controller 380 according to device parameters, user commands, and combinations thereof.

The sensing unit 340 is typically implemented using one or more sensors configured to sense internal information of the mobile terminal, the surrounding environment of the mobile terminal, user information, and the like. For example, the sensing unit 340 may include at least one of a proximity sensor 341, illumination sensor 342, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 321), a microphone 322, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The terminal 300 may be configured to utilize information obtained from sensing unit 340, and in particular, information obtained from one or more sensors of the sensing unit 340, and combinations thereof.

The output unit 350 is typically configured to output various types of information, such as audio, video, tactile output, and the like. The output unit 350 is shown having a display unit 351, an audio output module 352, a haptic module 353, and an optical output module 354.

The display unit 351 may have an inter-layered structure or an integrated structure with a touch sensor in order to facilitate a touch screen. The touch screen may provide an output interface between the terminal 300 and a user, as well as function as the user input unit 323 which provides an input interface between the terminal 300 and the user.

The interface unit 360 serves as an interface with various types of external devices that may be coupled to the terminal 300. The interface unit 360, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the terminal 300 may perform assorted control functions associated with a connected external device, in response to the external device being connected to the interface unit 360.

The memory 370 is typically implemented to store data to support various functions or features of the terminal 300. For instance, the memory 370 may be configured to store application programs executed in the terminal 300, data or instructions for operations of the terminal 300, and the like. Some of these application programs may be downloaded from an external server via wireless communication. Other application programs may be installed within the terminal 300 at time of manufacturing or shipping, which is typically the case for basic functions of the terminal 300 (for example, receiving a call, placing a call, receiving a message, sending a message, and the like). It is common for application programs to be stored in the memory 370, installed in the terminal 300, and executed by the controller 380 to perform an operation (or function) for the terminal 300.

The controller 380 typically functions to control overall operation of the terminal 300, in addition to the operations associated with the application programs. The controller 380 may provide or process information or functions appropriate for a user by processing signals, data, information and the like, which are input or output by the various components depicted in FIG. 5, or activating application programs stored in the memory 370. As one example, the controller 380 controls some or all of the components illustrated in FIG. 5 according to the execution of an application program that have been stored in the memory 370.

The power supply unit 390 may be configured to receive external power or provide internal power in order to supply appropriate power required for operating elements and components included in the terminal 300. The power supply unit 390 may include a battery, and the battery may be configured to be embedded in the terminal body, or configured to be detachable from the terminal body.

Figure 6:
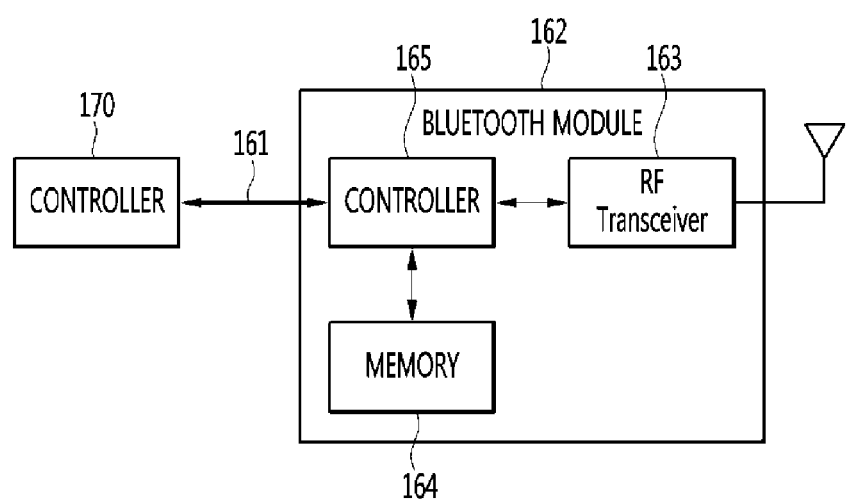
FIG. 6 is a block diagram illustrating an example of a Bluetooth module of constituents of a communication unit provided in the display device of FIG. 1.
Figure 7:
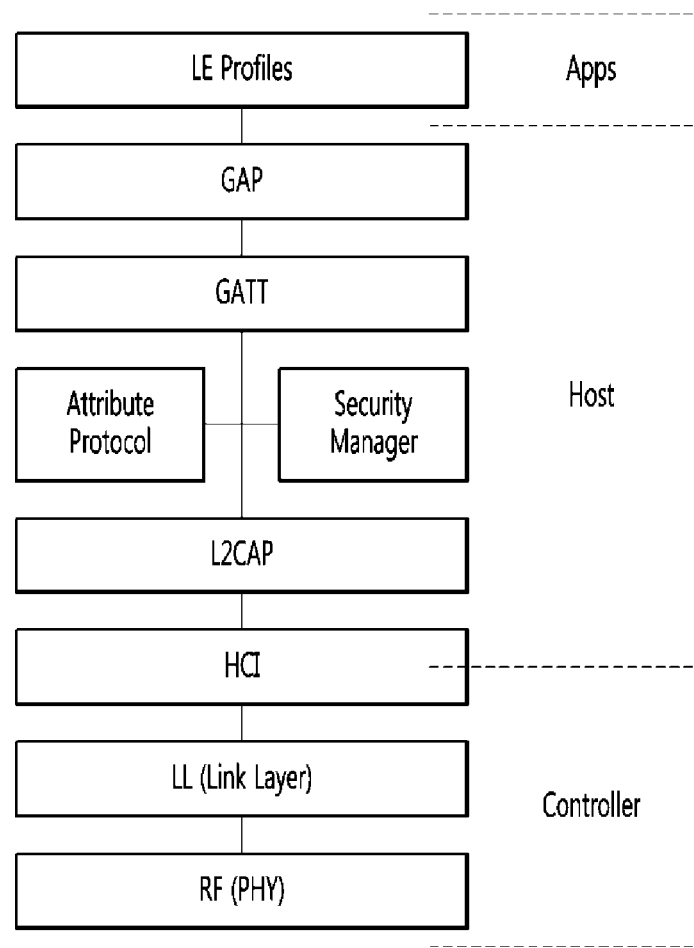
FIG. 7 is a view for explaining a protocol structure in a Bluetooth low energy technology applied to the display device according to an embodiment.

FIG. 6 is a block diagram illustrating an example of a Bluetooth module of constituents of the communication unit provided in the display device of FIG. 1, and FIG. 7 is a view for explaining a protocol structure in a Bluetooth low energy technology applied to the display device according to an embodiment.

Referring to FIG. 6, a communication unit 160 of the display device 100 may include a Bluetooth module 162 which supports a Bluetooth communication technology. That is, the communication unit 160 according to an embodiment may correspond to a wireless communication unit.

The Bluetooth module 162 may include an RF transceiver 163, a memory, and a controller 165. Since the components of the Bluetooth module 162 of FIG. 6 are not limited thereto, the Bluetooth module 162 may further include more components according to an embodiment.

The RF transceiver 163 may transmit a signal according to the Bluetooth communication scheme or receive a signal from the outside.

The memory 164 may store data, information, and/or firmware that are required for an operation of the Bluetooth module 162. The memory 164 of FIG. 6 may be understood as including an internal memory of the controller 165.

The controller 165 may control an overall operation of the Bluetooth module 162. The controller 165 may be connected to the controller 170 of the display device 100 through a host controller interface (HCI) 161 to transmit/receive various signals and/or a variety of information.

Particularly, according to an embodiment, the Bluetooth module 162 may operate after the power of the display device 100 is turned off. The controller 170 of the display device 100 may control the Bluetooth module 162 so that the Bluetooth module 162 is switched to operate in a wake-up mode when the power of the display device 100 is turned off. The wake-up mode of the Bluetooth module 162 will be described later in more detail with reference to FIG. 13.

The Bluetooth module 162 provided in the display device 100 may support a BLE technology.

Referring to FIG. 7, a host may correspond to the controller 170 of the display device 100, and the controller may correspond to the Bluetooth module 162.

For compatibility with the existing Bluetooth technology, an RF, a host controller interface (HCI), and a logical link control and adaptation protocol (L2CAP) layer may be the same as existing ones, and some functions for low energy technology may be added. For example, the RF may correspond to the RF transceiver 163 of FIG. 6.

The link layer (LL) may be composed of a combination of hardware and software. For example, the LL may correspond to a combination of the controller 165 and the firmware. The LL may serve as a baseband (BB) and a link manager (LM) of the existing Bluetooth.

Particularly, according to an embodiment, the LL may perform an overall operation for the wake-up mode.

Although a security function is performed in a generic access profile (GAP) layer in the existing Bluetooth, the security function may be strengthened by forming a security manager (SM) in the low energy technology. In wireless communication environments, a distribution key scheme is used for identification and encoding, and security capability of a key depends on performance of an algorithm in a distributing device.

The GAP layer may be a layer that is newly implemented for a BLE technology different from the existing Bluetooth. The GAP layer is used to control how role selection and multi-profile operations occur for communication between the low energy devices and also is mainly used for device search, connection occurrence, and security procedures.

There is an attribute protocol as a newly added layer. The attribute protocol is used to communicate with a server and a client and has an attribute handle that is used by the client to access attributes in the server. For example, protocol operation commands include "request", "response", "command", "notification", and the like. A genetic attribute profile (GATT) layer is also a newly added layer. The GATT layer uses an attribute protocol to define service frameworks, service formats, and procedures. The procedures define setting of discovering, reading, writing, notify, and indicating characteristics.

In this embodiment, when the power of the display device 100 is turned off, the controller 170 may control the Bluetooth module 162 so that the Bluetooth module 162 operates in the wake-up mode. In this case, the Bluetooth module 162 may continuously operate even when the power of the display device 100 is turned off. That is, in the protocol structure of FIG. 7, when the power of the display device 100 is turned off, the controller may continuously operate.

Hereinafter, specific embodiments of the present disclosure will be described.

Figure 8:
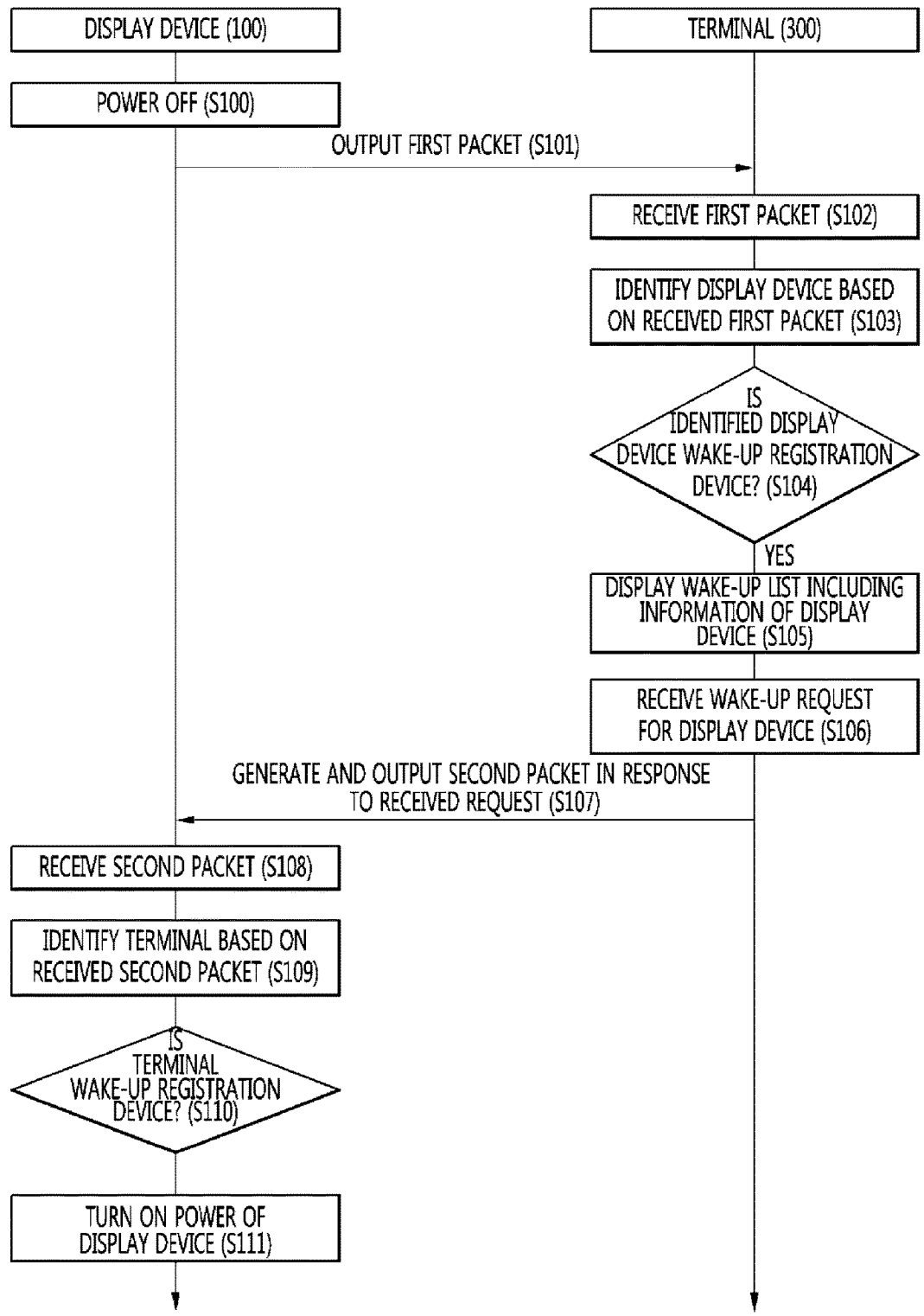
FIG. 8 is a flowchart for explaining an example of an operation of a display system provided in the display device of FIG. 1.

FIG. 8 is a flowchart for explaining an example of an operation of the display system provided in the display device of FIG. 1.

In the following descriptions of this specification, the packet outputted by the display device 100 and the terminal 300 may correspond to an advertising packet by the BLE technology. In general, the advertising packet may be used to notify that a device for outputting the advertising packet exists to other peripheral devices so as to connect the device to the other peripheral devices. The advertising packet may be broadcasted to the periphery thereof to allow a plurality of peripheral devices disposed around the corresponding device to receive the advertising packet.

However, the packet outputted according to an embodiment is not limited to only the advertising packet by the BLE technology, but may include various kinds of packets having similar uses.

Referring to FIG. 8, when the power of the display device 100 is turned off (S100), the display device 100 may output a first packet (S101).

Particularly, when the power of the display device 100 is turned off, the controller 170 of the display device 100 may control the Bluetooth module 162 so that the Bluetooth module 162 is switched in operation mode to operate in the wake-up mode. The wake-up mode may represent a mode in which the Bluetooth module 162 periodically broadcasts the advertising packet and receives a packet outputted in response to a wake-up request of the display device 100 from a specific terminal receiving the broadcasted advertising packet to turn on (wake up) the power of the display device 100.

According to an embodiment, the controller 170 may determine whether the wake-up mode is switched based on whether a registered (or permitted) wake-up registration device exists to turn on the power of the display device 100. For example, when information of the terminal, which is registered to turn on the power of the display device 100, does not exist, the controller 170 may not switch the operation mode of the Bluetooth module 162 into the wake-up mode even though the power of the display device 100 is turned off. The information of the registered terminal may include at least one of a MAC address and a Bluetooth device address of the terminal.

The first packet may include a variety of information for identification of the display device 100. For example, the first packet may include the MAC address and/or the Bluetooth device address of the display device 100.

The controller 165 of the Bluetooth module 162 may control the RF transceiver 163 to broadcast the first packet. A transmission distance of the first packet broadcasted by the RF transceiver 163 may be within about 40 m, but this is not limited thereto.

The terminal 300 may receive the first packet outputted (broadcasted) from the display device 100 (S102). For example, when a distance between the terminal 300 and the display device 100 is less than the transmission distance of the first packet, the terminal 300 may receive the first packet.

The terminal 300 may identify the display device 100 on the basis of the received first packet (S103).

Particularly, the terminal 300 may identify the display device 100 by using the MAC address or the Bluetooth device address of the display device 100, which are included in the first packet.

The terminal 300 may determine whether the identified display device 100 is a wake-up enabled device (S104).

The wake-up enabled device represents a device that is registered in the terminal 300 so that a specific packet is outputted to turn on the power even though the terminal 300 is not connected. The terminal 300 may store information of at least one wake-up enabled device. The information of the at least one wake-up enabled device may include a MAC address and/or a Bluetooth device address of the corresponding device.

When the identified display device 100 corresponds to the wake-up enabled device, the terminal 300 may display a wake-up list including the information of the display device 100 on the display unit 351 (S105).

The wake-up list may include information of at least one device corresponding to a wake-up enabled device of a plurality of devices existing within a predetermined distance from the terminal 300. The plurality of devices existing within the predetermined distance may represent that the first packet outputted from each of the plurality of devices is received to the terminal 300.

The terminal 300 may receive a wake-up request about the display device 100 on the basis of the displayed wake-up list (S106).

For example, the controller 380 of the terminal 300 may receive an input for selecting at least one device included in the wake-up list displayed through the display unit 351 to wake up the display device 100, thereby receiving the wake-up request.

According to an embodiment, the controller 380 may receive a request for executing a specific function (or a specific application, and the like) of the display device 100 together with the wake-up of the display device 100. For example, the controller 380 may receive a request for executing the wake-up and the screen mirroring of the display device 100. Related examples will be described in more detail with reference to FIGS. 16 to 19.

The terminal 300 may generate a second packet in response to the received wake-up request to output the generated second packet (S107).

For example, the second packet may include at least one of a MAC address of the terminal 300, a Bluetooth device address of the display device 100, and a Bluetooth device address of the terminal 300.

According to an embodiment, when the terminal 300 receives the wake-up and screen mirroring execution request, the second packet may further include information corresponding to the screen mirroring execution request.

The second packet may also correspond to an advertising packet, but is not limited thereto.

The display device 100 may receive the second packet outputted from the terminal 300 (S108) to identify the terminal 300 on the basis of the received second packet (S109).

When the Bluetooth device address of the display device 100 is included in the second packet received through the RF transceiver 163, the controller 165 may identify the terminal 300 on the basis of the MAC address or the Bluetooth device address of the terminal 300, which are included in the second packet.

When the identified terminal 300 corresponds to the wake-up registration device (YES in operation S110), the power of the display device 100 may be turned on (woken up) (S111).

When the identified terminal 300 is the wake-up registration device, the controller 165 may transmit a signal to the controller 170 or the power supply unit 190 to turn on the power of the display device 100.

According to an embodiment, when the information about the screen mirroring execution request is further included in the second packet, the display device 100 may execute the screen mirroring without a separate additional input after the power of the display device 100 is turned on.

Figure 9:
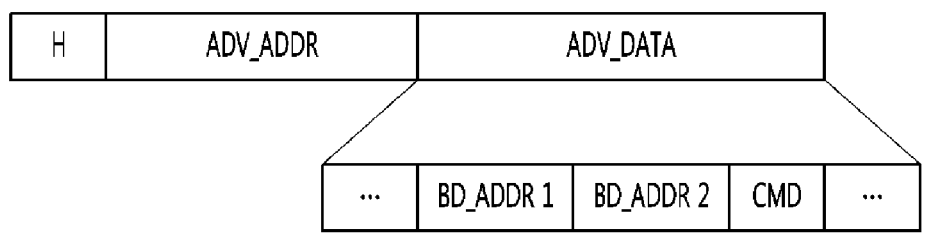
FIG. 9 is a view illustrating an example of a structure of a second packet outputted from a terminal of FIG. 8.

FIG. 9 is a view illustrating an example of a structure of the second packet outputted from the terminal of FIG. 8.

Referring to FIG. 9, when the second packet corresponds to the advertising packet of the BLE technology, a protocol data unit (PDU) included in the second packet may have a structure as illustrated in FIG. 9.

A head H of the PDU may include information about a type of second packet (connectability and whether the packet is to be received) and a length of a payload. An advertising address ADV_ADDR may include the MAC address of the device that has output the second packet, i.e., the terminal 300.

Advertising data ADV_DATA included in the PDU of the second packet may include information about a Bluetooth device address BD_ADDR1 of the display device 100 that outputs the first packet, a Bluetooth device address BD_ADDR2 of the terminal 300 that outputs the second packet, and a request (or a command) received in the operation S106 of FIG. 8.

When the Bluetooth device address BD_ADDR1 of the display device 100 is included in the second packet, the display device 100 receiving the second packet may identify the terminal 300, which outputs the second packet, on the basis of at least one of the advertising data ADV_DATA and the Bluetooth device address BD_ADDR2.

When the identified terminal 300 corresponds to the wake-up registration device, the display device 100 may perform an operation corresponding to a request CMD included in the second packet. For example, when the request CMD is the wake-up request, the power of the display device 100 may be turned on. For another example, when the request CMD is the wake-up and screen mirroring execution request, the screen mirroring function may be executed while the power of the display device 100 is turned on.

According to the embodiment described with reference to FIGS. 8 and 9, the display device 100 may receive the wake-up request from the peripheral terminal 300 through the BLE technology even though the power of the display device 100 is turned off and may turn on the power of the display device 100 in response to the received request. Thus, the user may conveniently turn on the display device 100 to utilize a desired function or application through the terminal 300.

According to the embodiment described with reference to FIGS. 8 and 9, since the second packet outputted from the terminal 300 is broadcasted, other device except for the display device 100 may receive the second packet. In this case, the other device receiving the second packet may reproduce the second packet as it is to output the reproduced second packet, and the display device 100 may receive the second packet outputted from the other device to mistakenly recognize the second packet as the packet outputted from the terminal 300 that is the wake-up registration device and thereby to cause a mistake such as the turn-on of the display device 100.

An additional embodiment for solving the above-described mistake will be described with reference to FIGS. 10 to 12.

Figure 10:
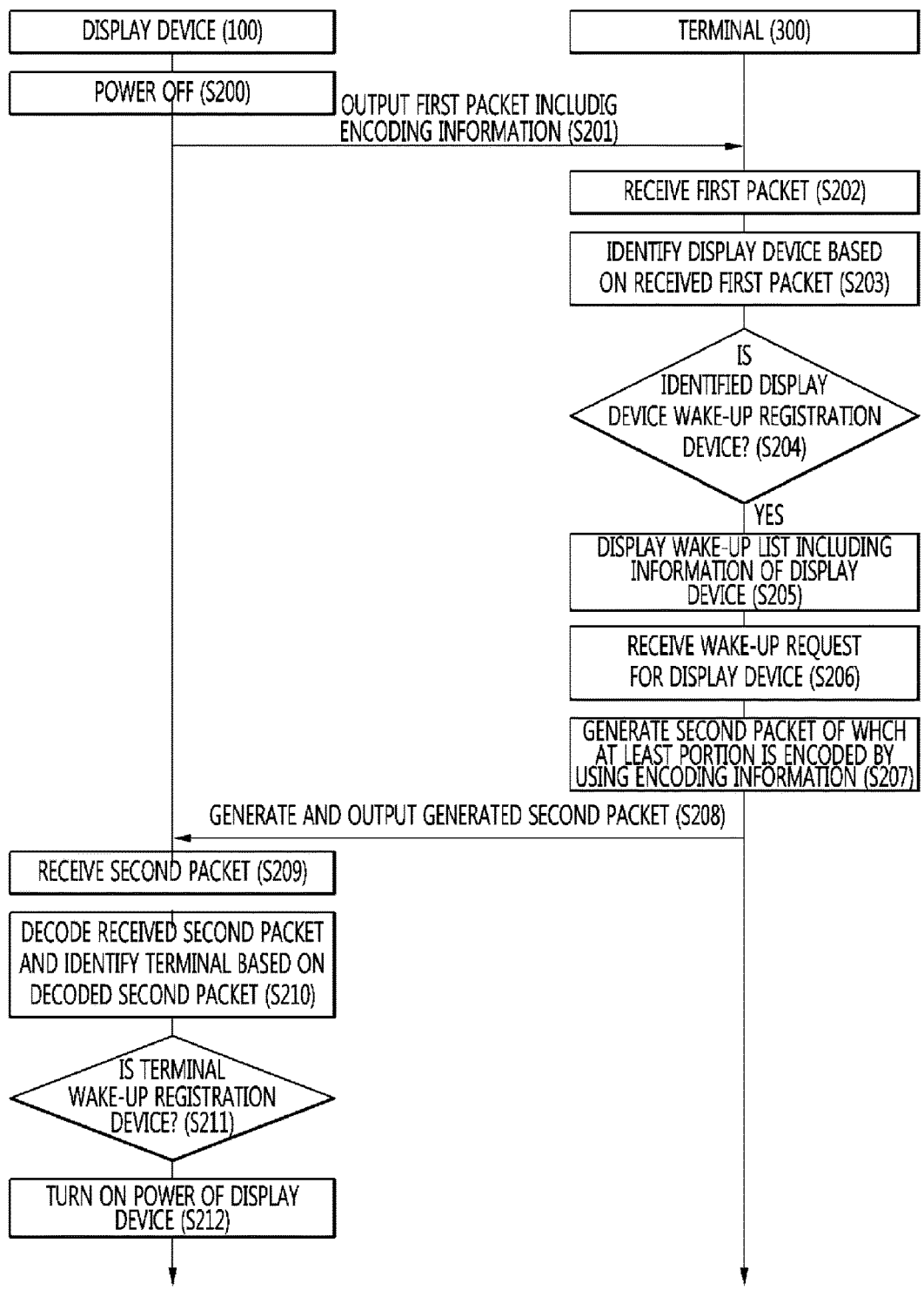
FIG. 10 is a flowchart for explaining an example of an operation of the display system.

FIG. 10 is a flowchart for explaining an example of an operation of the display system. FIG. 11 is a view illustrating an example of a structure of the first packet of FIG. 10, and FIG. 12 is a view illustrating an example of a structure of the second packet of FIG. 10.

Referring to FIG. 10, when the power of the display device 100 is turned off (S200), the display device 100 may output (broadcast) a first packet including encoding information (S201).

Unlike the first packet of FIG. 8, the first packet of FIG. 10 may include the encoding information. For example, the encoding information may correspond to information (e.g., a link key and the like) that is preset between the display device 100 and the terminal 300 or predefined information and may include a specific time-variable value.

Figure 11:
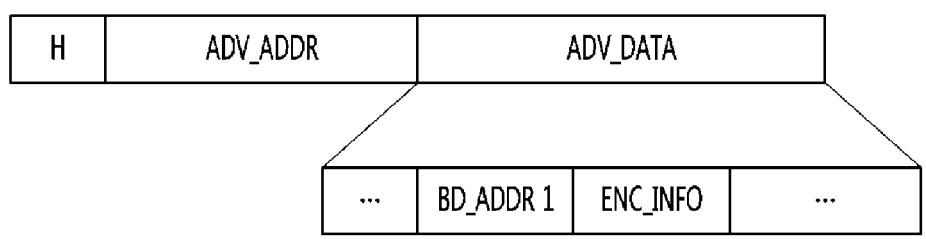
FIG. 11 is a view illustrating an example of a structure of a first packet of FIG. 10.

Referring to FIG. 11, a Bluetooth device address BD_ADDR1 and encoding information ENC_INFO of the display device 100 may be included in the advertising data ADV_DATA of the PDU of the first packet. The encoding information ENC_INFO may include a value that changes every time the first packet is transmitted or may include information (e.g., the link key and the like) that is preset between the display device 100 and the terminal 300. The link key may be information set between the display device 100 and the terminal 300 as information used in an authentication process when the display device 100 is connected to the terminal 300.

According to an embodiment, the advertising data ADV_DATA of the first packet may further include additional information such as a power state of the display device 100 and information about a supportable function or application.

The description will be made again with reference to FIG. 10.

Since the operations S202 to S206 are substantially the same as the operations S102 to S106, their detailed descriptions will be omitted.

When the wake-up request about the display device 100 is received, the terminal 300 may generate a second packet, of which at least a portion is encoded, by using encoding information (S207).

That is, unlike the second packet of FIGS. 8 and 9, at least a portion of the second packet of FIG. 10 may have been encoded. The encoding may represent a case in which some field values of the second packet are encoded by using the encoding information or a case in which at least a portion of the second packet is changed by a predetermined encoding method such as a case in which the encoding information is inserted between some field values of the second packet to change the second packet.

Figure 12:
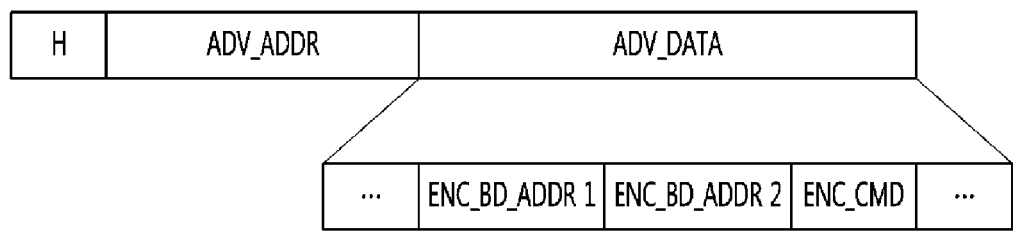
FIG. 12 is a view illustrating an example of a structure of a second packet of FIG. 10.

Referring to FIG. 12, the terminal 300 may generate the second packet in which at least one of the Bluetooth device address of the display device 100, the Bluetooth device address of the terminal 300, and the request (or the command) is encoded based on the encoding information. Referring to FIG. 12, the advertising data ADV_DATA may include at least one of the encoded Bluetooth device address ENC_BD_ADDR1 of the display device 100, the encoded Bluetooth device address ENC_BD_ADDR2 of the terminal 300, and the encoded request (or command) ENC_CMD.

The encoding may represent a case in which at least a portion of the advertising data ADV_DATA is encoded (e.g., an XOR operation, etc.) by using the encoding information. Alternatively, the encoding may represent a case in which at least a portion of the encoding information is inserted in a predetermined position of the advertising data ADV_DATA. That is, the encoding represents that at least a portion of the advertising data ADV_DATA is changed. Since the encoding method is defined between the display device 100 and the terminal 300 that is the wake-up registration device of the display device 100, other devices may not have information about the encoding method. Thus, security for the second packet outputted by the terminal 300 may be improved.

Referring again to FIG. 10, the display device 100 may receive the second packet outputted from the terminal (S209), decode the received second packet, and identify the terminal 300 on the basis of the decoded second packet (S210).

The display device 100 may decode the second packet on the basis of the encoding information included in the first packet outputted in the operation S201. According to an embodiment, when the first packet is periodically outputted, and the encoding information is changed every time the first packet is outputted, the display device 100 may perform the decoding by using each of a plurality of pieces of encoding information included in the plurality of first packets outputted between a time point before a reference time from the current time point and the current time point.

Since the operations S211 and S212 are substantially the same as the operations S110 to S111, their detailed descriptions will be omitted.

According to the embodiment described with reference to FIGS. 10 to 12, since the second packet outputted from the terminal 300 is encoded according to the encoding method that is set between the display device 100 and the terminal 300, even though the other device receives the second packet, data included in the second packet may not be accurately acquired. Thus, the security between the display device 100 and the terminal 300 may be improved.

Figure 13:
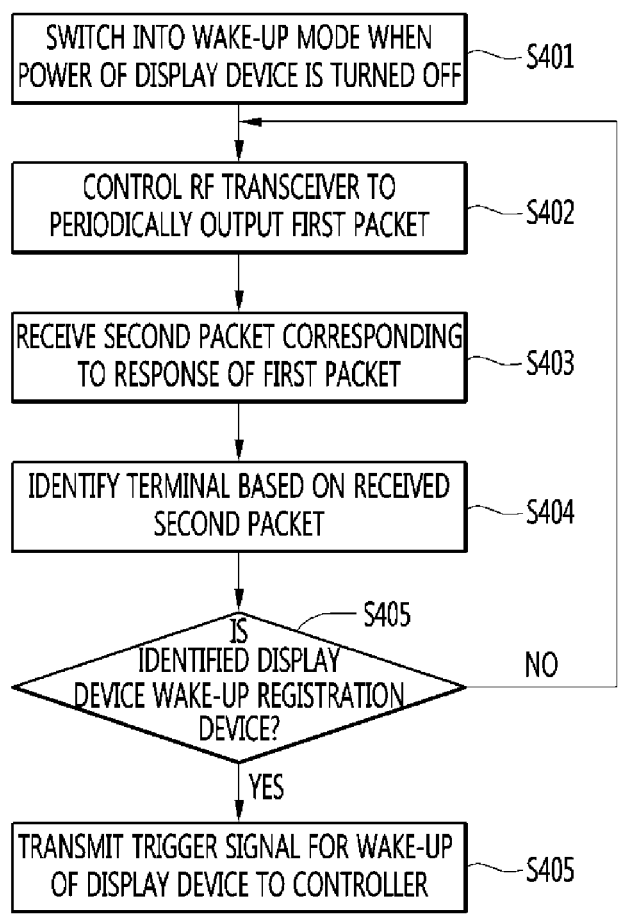
FIG. 13 is a flowchart for explaining an operation of a controller of a Bluetooth module provided in the display device in more detail in connection with the embodiment of FIG. 8 or 10.

FIG. 13 is a flowchart for explaining an operation of the controller of the Bluetooth module provided in the display device in more detail in connection with the embodiment of FIG. 8 or 10.

Referring to FIG. 13, the controller 165 of the Bluetooth module 162 may switch the operation mode of the Bluetooth module 162 into the wake-up mode when the power of the display device 100 is turned off (S401) and control the RF transceiver 163 to periodically output the first packet (S402). As described above, the wake-up mode represents a mode in which the Bluetooth module 162 periodically broadcasts the advertising packet even though the power of the display device 100 is turned off, receives a packet corresponding to a response of the broadcasted advertising packet to identify a transmission device of the received packet, and turns on the power of the display device 100 on the basis of the identified transmission device.

The display device 100 may receive a second packet corresponding to a response of the outputted first packet to identify the terminal 300 on the basis of the received second packet (S403 & S404).

When the identified terminal 300 corresponds to the wake-up registration device of the display device (YES in operation S405), the controller 165 may transmit a trigger signal for the wake-up (turn-on) of the display device 100 to the controller 170. The trigger signal may be transmitted to the controller 170 through the HCI 161 of FIG. 6. According to an embodiment, the controller 165 may transmit a signal for controlling the power supply unit 190 of the display device 100 to the power supply unit 190.

According to the above-described embodiments, when the power of the display device 100 is turned off, the wake-up request of the display device 100 may be received from an external terminal while minimizing power consumption by using the Bluetooth module 162 supporting the BLE technology. The display device 100 may be conveniently turned on by using the portable terminal 300 without having a separate remote controller.

Figure 14:
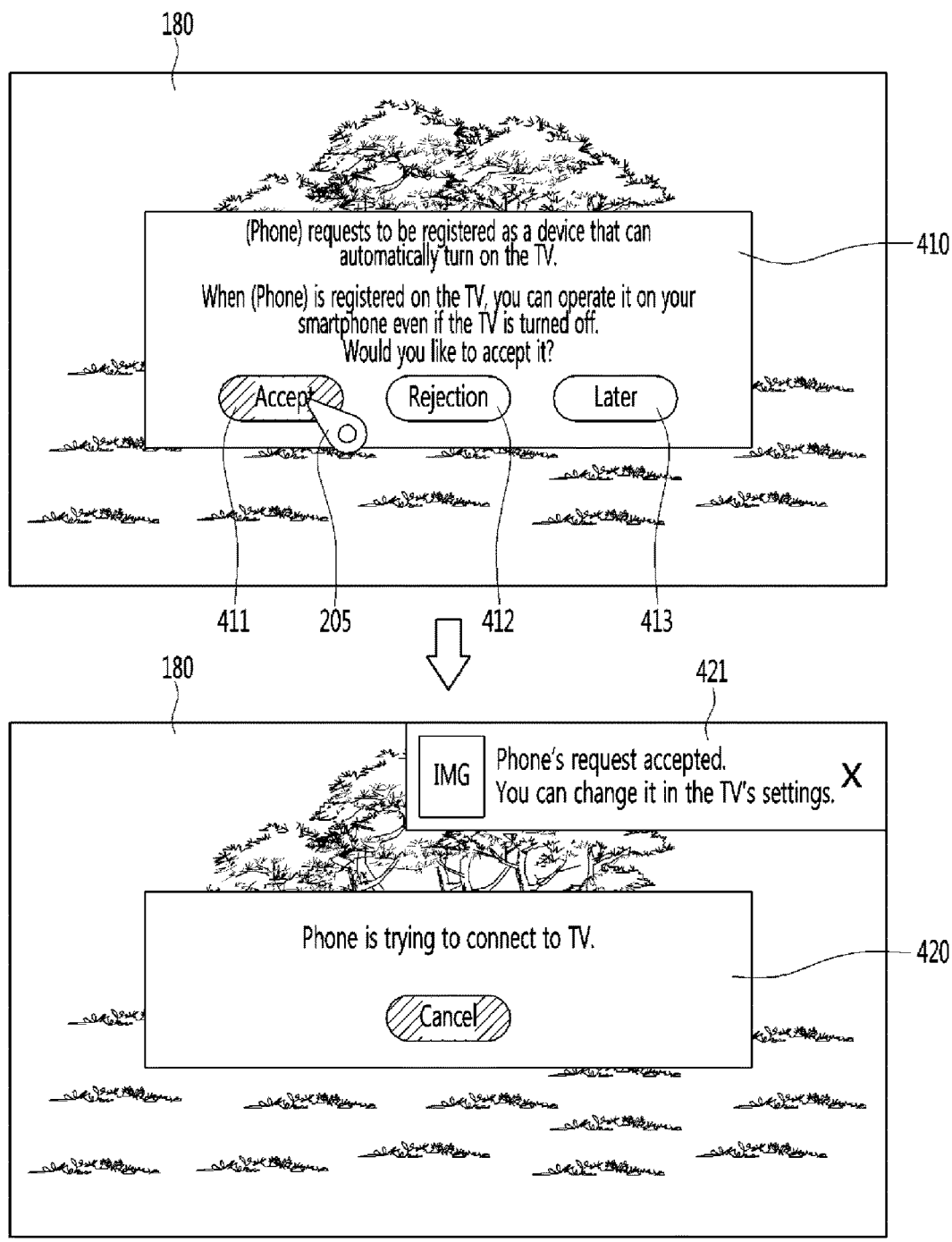
FIGS. 14 and 15 are views illustrating an example of a process in which the terminal provided in the display system is registered as a wake-up device of the display device according to an embodiment.
Figure 15:
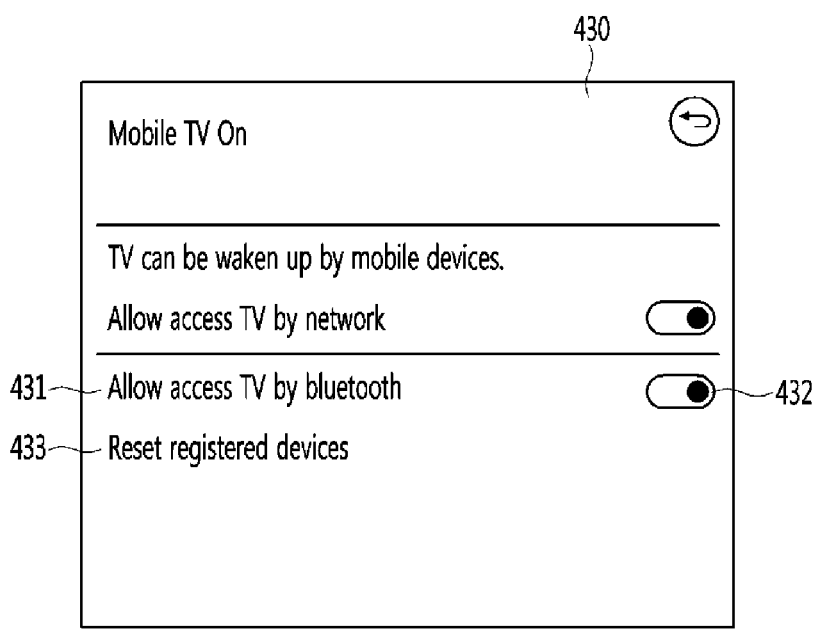

FIGS. 14 and 15 are views illustrating an example of a process in which the terminal provided in the display system is registered as the wake-up device of the display device according to an embodiment.

Referring to FIG. 14, when the display device 100 is initially connected to the terminal 300 or when a user of the terminal 300 intends to register the terminal 300 as the wake-up registration device of the display device 100, the controller 170 of the display device 100 may display a confirmation window 410 indicating whether to register the terminal 300 as the wake-up registration device through the display unit 180.

When the user selects the accept button 411 provided on the confirmation window 410, the display device 100 may register the terminal 300 as the wake-up registration device and store identification information (e.g., the MAC address and the like) of the terminal 300 in the storage unit 140.

Referring to FIG. 15, a setting screen 430, which is related to the wake-up mode, of setting screens of the display device 100 may be displayed. The setting screen 430 may include a Bluetooth access setting item 431 for setting whether the display device 100 is accessible through Bluetooth, e.g., the BLE technology, a button 432 for activating/inactivating the Bluetooth access setting item 431, and a reset item 433 for deleting the information of the wake-up registration device. When the button 432 is selected, the activation/inactivation of the Bluetooth access setting item 431 may be switched. When the reset item 433 is included, the controller 170 may delete the information of the wake-up registration device, which is stored in the storage unit 140.

Hereinafter, embodiments in which an additional function or applicator is executed while the power of the display device 100 is turned on by the second packet outputted from the terminal 300 will be described with reference to FIGS. 16 to 19.

Figure 16:
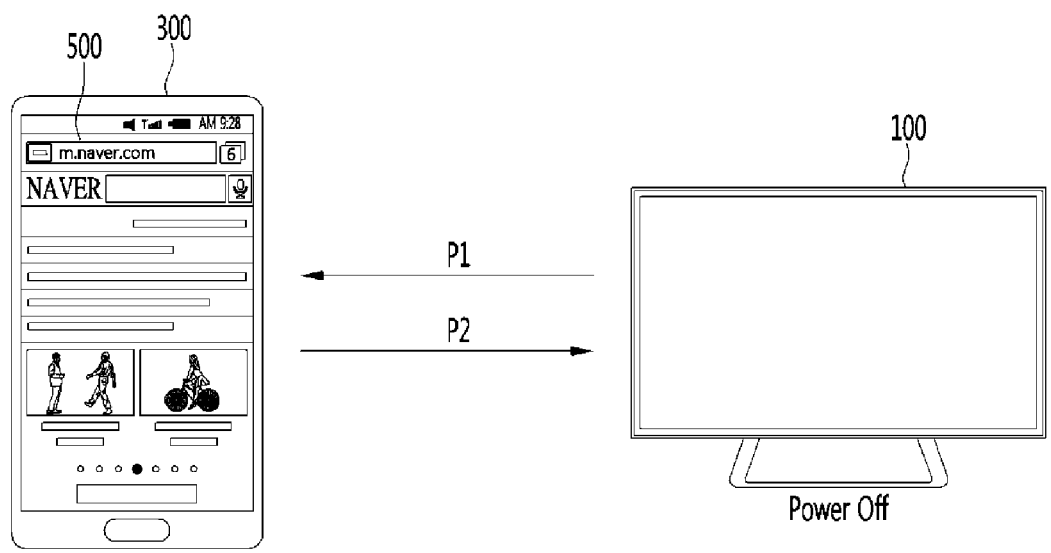
FIGS. 16 and 17 are views illustrating an example of an operation in which the display device performs a screen mirroring function while being woken up by the terminal provided in the display system.
Figure 17:
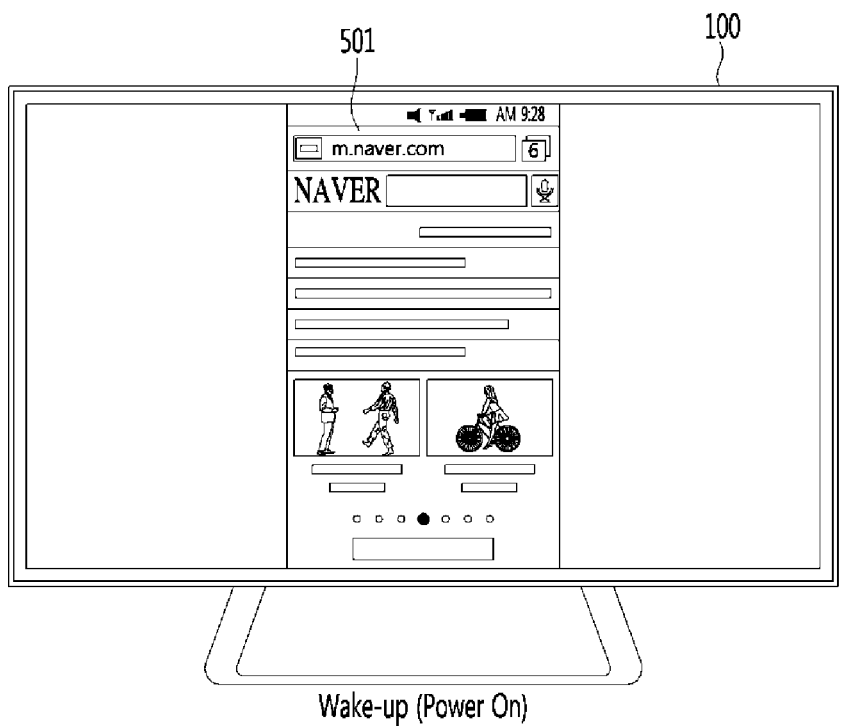

FIGS. 16 and 17 are views illustrating an example of an operation in which the display device performs the screen mirroring function while being woken up by the terminal provided in the display system.

Referring to FIG. 16, the display device 100 of which the power is turned off may periodically output a first packet P1 through the Bluetooth module 162. The first packet P1 may correspond to the first packet that is described with reference to FIG. 8 or 10.

The terminal 300 may receive the first packet to identify the display device 100. Here, when the identified display device 100 is the wake-up enabled device, the terminal 300 may display a wake-up list including the information of the display device 100.

The terminal 300 may receive a wake-up and screen mirroring execution request of the display device 100 from the user. The screen mirroring function represents a function of display a screen 500, which is displayed on the display unit 351 of the terminal 300, on a display unit 180 of the display device 100 in the same manner.

The terminal 300 may output a second packet P2 including information about the wake-up and mirroring execution request. The second packet P2 may correspond to the second packet that is described with reference to FIG. 9 or 12.

Referring to FIG. 17, the display device 100 may receive the second packet P2 outputted from the terminal 300 to identify the terminal 300 on the basis of the received second packet P2. When the identified terminal 300 corresponds to the wake-up registration device, the display device 100 may execute the screen mirroring while the power of the display device 100 is turned on (woken up). As the screen mirroring is executed, a mirroring screen 501 that is the same as the screen 500 displayed on the terminal 300 may be displayed on the display unit 180. For this, the display unit 100 and the terminal 300 may be connected to each other in a separate wireless communication scheme (e.g., Wi-Fi direction, etc.). The display device 100 may receive image data corresponding to the screen 500 displayed on the terminal 300 from the terminal 300 to display the mirroring screen 501 on the basis of the received image data.

Figure 18:
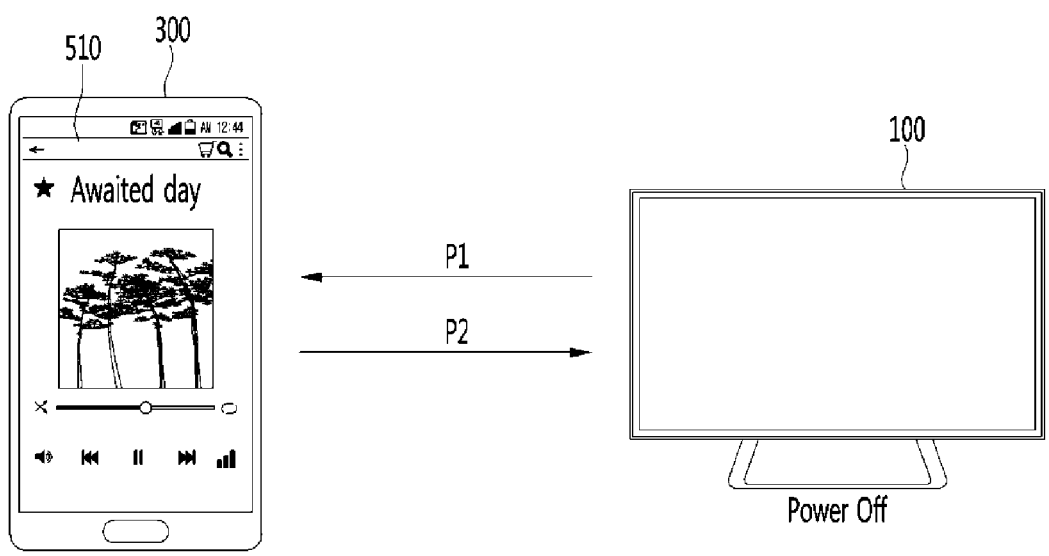
FIGS. 18 and 19 are views illustrating an example of an operation in which the display device executes a music application while being woken up by the terminal provided in the display system is a diagram illustrating an example of an outer appearance of a vehicle having a parking assistance apparatus according to an implementation.
Figure 19:
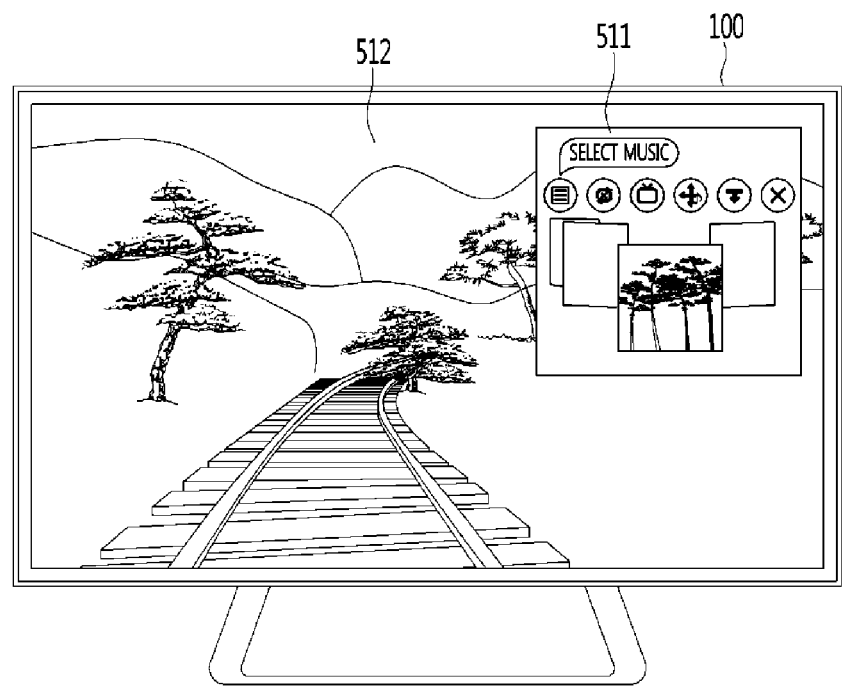

FIGS. 18 and 19 are views illustrating an example of an operation in which the display device executes a music application while being woken up by the terminal provided in the display system.

Referring to FIG. 18, the terminal 300 may receive a wake-up and music application execution request of the display device 100 from the user. The music application execution request may correspond to a request for executing a music application of the display device 100 so that the same music as the music being executed and played back by the terminal 300 is played.

The terminal 300 may output a second packet P2 including information about the received wake-up and music application execution request.

Referring to FIG. 19, the display device 100 may receive the second packet P2 to identify the terminal 300 on the basis of the received second packet P2. When the identified terminal 300 corresponds to the wake-up registration device, the display device 100 may execute the music application while the power of the display device 100 is turned on (woken up). According to an embodiment, when the power of the display device 100 is turned on, the display device 100 may display an execution screen 511 of the music application on a screen 512 of a channel that is being watched recently. As the music application is executed, the display device 100 may play the same music as the music being played back by the terminal 300.

Although not shown, when the terminal 300 receives the first packet from the display device 100, an installation screen of an application related to the display device 100 may be automatically displayed, or a registration process between the application and the display device 100 may be automatically executed.

Alternatively, when the terminal 300 receives the first packet from the display device 100 at the same time as an alarm time set in the terminal 300 or within a reference range, the terminal 300 may automatically output the second packet including the wake-up request without receiving the wake-up request of the display device 100 from the user.

That is, the terminal 300 may conveniently turn on the power of the display device 100 through a short-range wireless communication scheme such as the BLE technology and also control the display device 100 to additionally execute a desired function or application while turning on the power of the display device 100, thereby simplifying the procedure for executing the corresponding function or application. Therefore, user's convenience may be improved.

According to the embodiment, event through the power of the display device is turned off, since the user is capable of turning on the power of the display device through the terminal, which is hold at any time by the user, the use convenience of the display device may be improved.

Also, since the user is capable of turning on the power of the display device and also requesting the additional function or the execution of the application at one time, the number of manipulation performed by the user may be reduced to improve the convenience.

In addition, when the power of the display device is turned on, since the power of the display device is turned on by receiving the wake-up request from the terminal through the Bluetooth technology, the power consumption of the display device may be reduced.

Also, since the terminal outputs the second packet that is encoded based on the encoding information included in the first packet outputted from the display device, the security between the display device and the terminal may be improved.

The above-described embodiments may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a controller of the display device. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a wireless communication unit configured to wirelessly transmit a packet or wirelessly receive a packet;
a memory configured to store information of at least one registered wake-up device; and
a controller configured to control the wireless communication unit to change to a wake-up mode or to not change to the wake-up mode based on whether specific information is stored in the memory,
wherein in response to power of the display device being turned off, the controller to:
determine whether the information of the at least one registered wake-up device is stored in the memory,
control the wireless communication unit to change to the wake-up mode when the information of the at least one registered wake-up device is determined to be stored in the memory, and
control the wireless communication unit to not change to the wake-up mode when the information of the at least one registered wake-up device is determined to not be stored in the memory, even when power of the display device is turned off,
wherein when the wireless communication unit is operating in the wake-up mode, the wireless communication unit is to output a first packet including information of the display device, wherein the first packet corresponds to an advertising packet,
wherein while the wireless communication unit is operating in the wake-up mode, the wireless communication unit to receive a second packet in response to the outputted first packet, and the controller to turn on the power of the display device based on the received second packet without the display device being wirelessly connected to a terminal that provides the second packet,
wherein the second packet corresponds to an advertising packet that is generated based on a wake-up request and is not generated in response to the first packet.

2. The display device according to claim 1, wherein in response to receiving the second packet, the wireless communication unit to identify the terminal that provides the second packet, and
wherein after the controller determines that the identified terminal corresponds to the at least one registered wake-up device, the power of the display device is turned on.

3. The display device according to claim 2, wherein the information of the at least one registered wake-up device includes a media access control (MAC) address of the at least one registered wake-up device or a Bluetooth device address of the at least one registered wake-up device, and
the wireless communication unit is configured to identify the terminal that provides the second packet based on the MAC address of the terminal or the Bluetooth device address of the terminal, which is provided in the second packet.

4. The display device according to claim 3, wherein the wireless communication unit is configured to identify the terminal that provides the second packet when information of the display device is provided in the second packet.

5. The display device according to claim 1, wherein in response to receiving the second packet, the wireless communication unit to identify a terminal that provides the second packet based on information within the second packet, and the wireless communication unit is to transmit, to the controller, a trigger signal to turn on the power of the display device based on the received second packet.

6. The display device according to claim 1, comprising a power supply to supply power to the display device,
wherein the wireless communication unit is configured to control the power supply to turn on the power of the display device based on the received second packet.

7. The display device according to claim 1, wherein the second packet includes information regarding a specific function of the display device or an application execution request of the display device, and
   wherein when the power of the display device is turned on, the controller is to execute the specific function or the application.

8. The display device according to claim 7, comprising a display,
   wherein the second packet includes a screen mirroring execution request, and
   wherein when the controller receives, from the terminal providing the second packet, image data corresponding to a screen displayed on the terminal when the power of the display device is turned on, the controller is to control the display to display a mirroring screen based on the received image data.

9. The display device according to claim 1, wherein the first packet includes encoding information, and
   the wireless communication unit is configured to decode information of the received second packet based on the encoding information and turn on the power of the display device based on the decoded information of the received second packet.

10. The display device according to claim 9, wherein when the wireless communication unit is operating in the wake-up mode, the wireless communication unit is to periodically output the first packet including the encoding information, and
    the outputted encoding information is to change each time the first packet is outputted from the wireless communication unit.

11. The display device according to claim 10, wherein the wireless communication unit is configured to decode the received second packet based on a plurality of encoding information within a plurality of first packets.

12. The display device according to claim 1, wherein the wireless communication unit includes a Bluetooth module configured to support Bluetooth low energy (BLE), and
    the first packet corresponds to an advertising packet of the BLE, and the second packet corresponds to an advertising packet of the BLE.

13. The display device according to claim 12, wherein the Bluetooth module to continuously operate.

* * * * *